(12) United States Patent  (10) Patent No.: US 7,950,589 B2
Oouchi  (45) Date of Patent: May 31, 2011

(54) PROGRAM, INFORMATION STORAGE MEDIUM, TWO-DIMENSIONAL CODE GENERATION SYSTEM, IMAGE GENERATION SYSTEM AND PRINTED MATERIAL

(75) Inventor: Satoru Oouchi, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 1125 days.

(21) Appl. No.: 11/712,515

(22) Filed: Mar. 1, 2007

(65) Prior Publication Data

US 2007/0277150 A1    Nov. 29, 2007

(30) Foreign Application Priority Data

Mar. 3, 2006   (JP) .................................. 2006-058519

(51) Int. Cl.
*G06K 19/06* (2006.01)
(52) U.S. Cl. ................ 235/494; 235/462.1; 235/462.11; 382/232; 717/109; 370/208
(58) Field of Classification Search .................. 235/494, 235/462.1, 462.11; 382/232; 717/109; 370/208
See application file for complete search history.

(56) References Cited

U.S. PATENT DOCUMENTS

| 2003/0210648 A1* | 11/2003 | Yang et al. ..................... 370/208 |
| 2006/0159348 A1* | 7/2006 | Engel ............................. 382/232 |
| 2009/0001165 A1* | 1/2009 | Zhang et al. ............. 235/462.11 |

FOREIGN PATENT DOCUMENTS

| JP | A 03-011482 | 1/1991 |
| JP | A 06-199078 | 7/1994 |
| JP | B 2938338 | 8/1999 |
| JP | A 2004-070960 | 3/2004 |
| JP | A 2004-206674 | 7/2004 |
| JP | A 2004-246927 | 9/2004 |
| JP | A 2004-533071 | 10/2004 |
| JP | A 2005-514810 | 5/2005 |
| WO | WO 02/101633 A1 | 12/2002 |

* cited by examiner

*Primary Examiner* — Allyson N Trail
(74) *Attorney, Agent, or Firm* — Oliff & Berridge, PLC

(57) ABSTRACT

A two-dimensional code generation system including: a data acquisition section which acquires size data of the two-dimensional code, original data to be read from the two-dimensional code, and given binary design data; an unused data region determination section which specifies an unused data region of the two-dimensional code depending on an amount of the original data, based on the size data and the original data; a binary design data conversion section which calculates a bit code by inversely converting the binary design data corresponding to the unused data region based on format information of the two-dimensional code; and a two-dimensional code generation section which converts the calculated bit code and a bit code of the original data based on the format information of the two-dimensional code to generate the two-dimensional code.

16 Claims, 10 Drawing Sheets

PROGRAM, INFORMATION STORAGE MEDIUM, TWO-DIMENSIONAL CODE GENERATION SYSTEM, IMAGE GENERATION SYSTEM AND PRINTED MATERIAL

Japanese Patent Application No. 2006-58519, filed on Mar. 3, 2006, is hereby incorporated by reference in its entirety.

BACKGROUND OF THE INVENTION

The present invention relates to a program, an information storage medium, a two-dimensional code generation system, an image generation system, and a printed material.

A two-dimensional code has been known in which modules representing data are two-dimensionally placed based on specific format information. The two-dimensional code allows a large amount of data to be read using a narrow region in comparison with a one-dimensional code. Japanese Patent No. 2938338 discloses a related-art technology, for example.

In such a two-dimensional code, a region which does not represent data occurs when the amount of data is small with respect to the size of the two-dimensional code. In a known two-dimensional code, modules are placed in a region which does not represent data based on specific format information.

On the other hand, the format information which causes modules to be placed in a region which does not represent data is configured so that various modules are placed in that region in a well-balanced manner. Therefore, it is impossible to provide the configuration of the module pattern of the two-dimensional code to be generated with a distinctive feature to distinguish the two-dimensional code from other two-dimensional codes.

SUMMARY

According to a first aspect of the invention, there is provided a program used for generating a two-dimensional code, the program causing a computer to function as:

a data acquisition section which acquires size data of the two-dimensional code, original data to be read from the two-dimensional code, and given binary design data;

an unused data region determination section which specifies an unused data region of the two-dimensional code depending on an amount of the original data, based on the size data and the original data;

a binary design data conversion section which calculates a bit code by inversely converting the binary design data corresponding to the unused data region based on format information of the two-dimensional code; and a two-dimensional code generation section which converts the calculated bit code and a bit code of the original data based on the format information of the two-dimensional code to generate the two-dimensional code.

According to a second aspect of the invention, there is provided a program used for generating data for generating a two-dimensional code, the program causing a computer to function as:

a data acquisition section which acquires size data of the two-dimensional code, original data to be read from the two-dimensional code, and given binary design data;

an unused data region determination section which specifies an unused data region of the two-dimensional code depending on an amount of the original data, based on the size data and the original data; and a binary design data conversion section which calculates a bit code by inversely converting the binary design data corresponding to the unused data region based on format information of the two-dimensional code.

According to a third aspect of the invention, there is provided a program used for generating a two-dimensional code image to be read as a two-dimensional code, the program causing a computer to function as:

an image generation section which generates the two-dimensional code image based on data of an original data image to be read from the two-dimensional code and data of a binary design image set in an unused data region of the two-dimensional code, wherein the image generation section changes the data of the binary design image to generate the two-dimensional code image.

According to a fourth aspect of the invention, there is provided a computer-readable information storage medium storing any one of the above-described programs.

According to a fifth aspect of the invention, there is provided a printed material on which the two-dimensional code generated by any one of the above-described programs.

According to a sixth aspect of the invention, there is provided a two-dimensional code generation system comprising:

a data acquisition section which acquires size data of the two-dimensional code, original data to be read from the two-dimensional code, and given binary design data;

an unused data region determination section which specifies an unused data region of the two-dimensional code depending on an amount of the original data, based on the size data and the original data;

a binary design data conversion section which calculates a bit code by inversely converting the binary design data corresponding to the unused data region based on format information of the two-dimensional code; and a two-dimensional code generation section which converts the calculated bit code and a bit code of the original data based on the format information of the two-dimensional code to generate the two-dimensional code.

According to a seventh aspect of the invention, there is provided an image generation system which generates a two-dimensional code image to be read as a two-dimensional code, the image generation system comprising:

an image generation section which generates the two-dimensional code image based on data of an original data image to be read from the two-dimensional code and data of a binary design image set in an unused data region of the two-dimensional code, wherein the image generation section changes the data of the binary design image to generate the two-dimensional code image.

DETAILED DESCRIPTION OF THE EMBODIMENT

Figure 1:
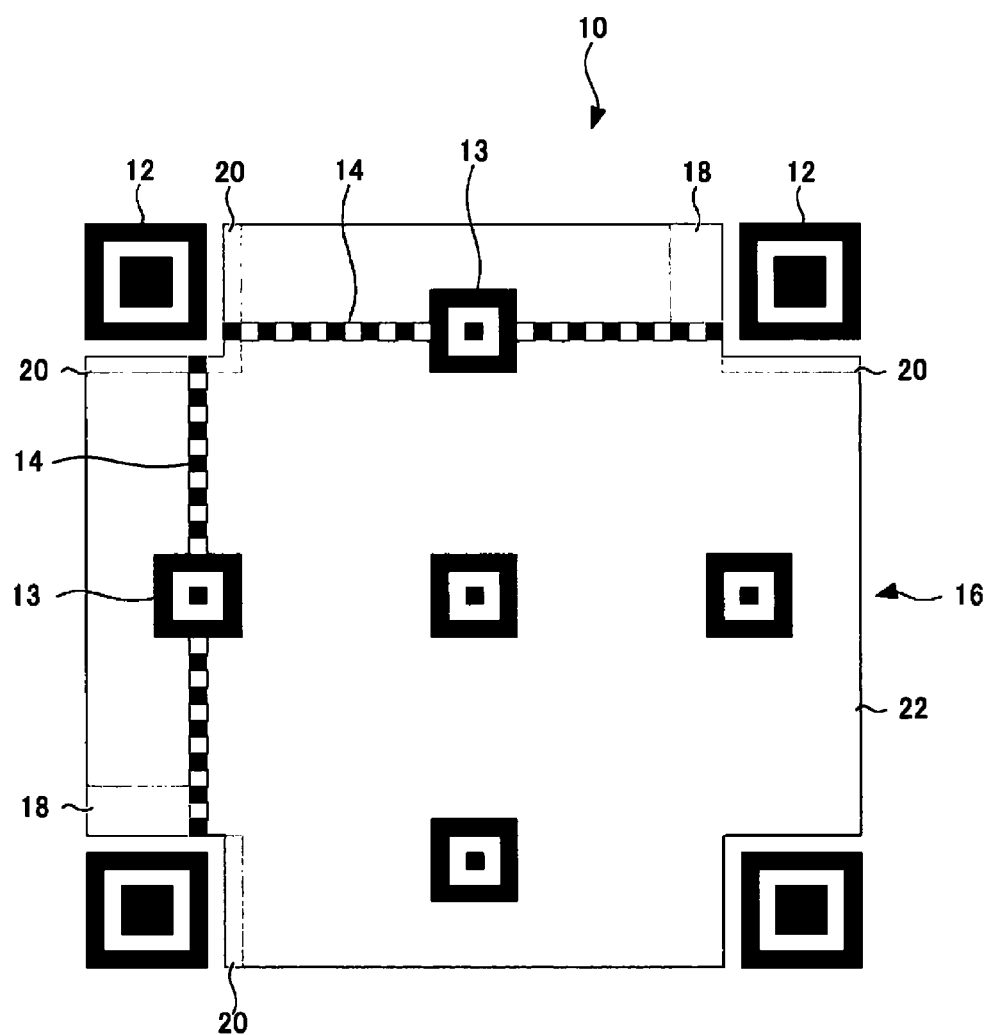
FIG. 1 is a diagram showing an example of the structure of a two-dimensional code according to one embodiment of the invention.

The invention may provide a program capable of generating a two-dimensional code so that modules of the two-dimensional code placed in a region which does not represent data are arranged to form an arbitrary design, an information storage medium, an image generation system which generates an image of the generated two-dimensional code, and a printed material.

(1) According to one embodiment of the invention, there is provided a two-dimensional code generation system comprising:

a data acquisition section which acquires size data of the two-dimensional code, original data to be read from the two-dimensional code, and given binary design data;

an unused data region determination section which specifies an unused data region of the two-dimensional code depending on an amount of the original data, based on the size data and the original data;

a binary design data conversion section which calculates a bit code by inversely converting the binary design data corresponding to the unused data region based on format information of the two-dimensional code; and a two-dimensional code generation section which converts the calculated bit code and a bit code of the original data based on the format information of the two-dimensional code to generate the two-dimensional code.

According to one embodiment of the invention, there is provided a program causing a computer to function as the above sections. According to one embodiment of the invention, there is provided a computer-readable information storage medium storing a program causing a computer to function as the above sections. According to one embodiment of the invention, there is provided a printed material on which a two-dimensional code generated by using the above-described two-dimensional code generation system, program, or information storage medium is printed.

According to the above embodiments, a two-dimensional code in which a binary design is formed can be generated by calculating the bit code obtained by inversely converting the binary design data. Since the information of the original data is placed in the generated two-dimensional code, the original data, which is information the user of the system intends to convey using the two-dimensional code, can be read using a two-dimensional code reading device.

According to the above embodiments, a two-dimensional code in which an attractive binary design pattern is formed can be easily generated according to the normal two-dimensional code generation procedure. Moreover, since the two-dimensional code is generated according to the normal two-dimensional code generation procedure, a reading device can accurately read the two-dimensional code, even if the binary design is formed.

(2) In each of the above-described two-dimensional code generation system, program and information storage medium, the two-dimensional code generation section may include an error correction data generation section which generates error correction data for correcting reading errors of the two-dimensional code to be generated based on the bit code; and the unused data region determination section may specify an error correction data region of the two-dimensional code based on the size data, specify an original data region of the two-dimensional code based on the original data, and specify the unused data region based on the size data of the two-dimensional code, the error correction data region, and the original data region.

According to this feature, the unused data region in which the binary design is formed can be specified based on the error correction data region and the original data region, and the binary design data in the unused data region can be extracted.

(3) In the above-described two-dimensional code generation system, the error correction data generation section may generate the error correction data based on error correction level data; and the two-dimensional code generation system may further comprise a two-dimensional code change section which accepts a process of changing the generated two-dimensional code based on the error correction level data.

In each of the above-described program and information storage medium, the error correction data generation section may generates the error correction data based on error correction level data; and the program or the information storage medium may further cause the computer to function as a two-dimensional code change section which accepts a process of changing the generated two-dimensional code based on the error correction level data.

According to this feature, the generated two-dimensional code can be changed within the range of the recovery capacity of the error correction algorithm. For example, part of the error correction data region can also be utilized as the design region by changing the two-dimensional code modules placed in the error correction data region.

(4) In each of the above-described two-dimensional code generation system, program and information storage medium, the two-dimensional code generation section may further include an alignment pattern setting section which sets an alignment pattern used for reading the two-dimensional code; and the alignment pattern setting section may accept a process of omitting the alignment pattern.

According to this feature, the degrees of freedom of the design pattern formed in the unused data region can be significantly increased, and the formed design pattern can be more beautifully displayed by omitting placement of the alignment pattern.

(5) The above-described two-dimensional code generation system may further comprise:

a code size determination section which determines the size of the two-dimensional code based on the size of the binary design data.

Each of the above-described program and information storage medium may further cause the computer to function as:

a code size determination section which determines the size of the two-dimensional code based on the size of the binary design data.

According to this feature, the size of the two-dimensional code which allows placement of the binary design pattern can be automatically determined based on the size of the binary design data.

(6) According to one embodiment of the invention, there is provided a two-dimensional code generation system used for generating data for generating a two-dimensional code, the system comprising:

a data acquisition section which acquires size data of the two-dimensional code, original data to be read from the two-dimensional code, and given binary design data;

an unused data region determination section which specifies an unused data region of the two-dimensional code depending on an amount of the original data, based on the size data and the original data; and a binary design data conversion section which calculates a bit code by inversely converting the binary design data corresponding to the unused data region based on format information of the two-dimensional code.

According to one embodiment of the invention, there is provided a program causing a computer to function as the above sections. According to one embodiment of the invention, there is provided a computer-readable information storage medium storing a program causing a computer to function as the above sections.

According to the above embodiments, data can be generated which can generate a two-dimensional code in which a binary design pattern is formed. The generated data for generating a two-dimensional code includes the information of the original data. Therefore, the original data which is information the user of the system intends to convey using the two-dimensional code symbol can be read using a two-dimensional code reading device, while forming the design pattern in the two-dimensional code, by generating the two-dimensional code based on the data generated according to the above embodiment.

According to the above embodiments, a two-dimensional code in which an attractive binary design pattern is formed can be easily generated according to the normal two-dimensional code generation procedure. Moreover, since the two-dimensional code is generated according to the normal two-dimensional code generation procedure, a reading device can accurately read the two-dimensional code, even if the binary design is formed.

(7) According to one embodiment of the invention, there is provided an image generation system which generates a two-dimensional code image to be read as a two-dimensional code, the image generation system comprising:

an image generation section which generates the two-dimensional code image based on data of an original data image to be read from the two-dimensional code and data of a binary design image set in an unused data region of the two-dimensional code, wherein the image generation section changes the data of the binary design image to generate the two-dimensional code image.

According to one embodiment of the invention, there is provided a program causing a computer to function as the above sections. According to one embodiment of the invention, there is provided a computer-readable information storage medium storing a program causing a computer to function as the above sections.

According to the above embodiments, the utility of the two-dimensional code can be significantly increased by changing the binary design pattern of the two-dimensional code image to generate a more attractive two-dimensional code.

Some embodiments of the invention will be described below. Note that the embodiments described below do not unduly limit the scope of the invention laid out in the claims herein. In addition, not all of the elements of the embodiments described below should be taken as essential requirements of the invention.

1. Structure of Two-Dimensional Code

FIG. 1 shows an example of the structure of a two-dimensional code symbol generated by a two-dimensional code generation system according to one embodiment of the invention. This embodiment illustrates an example using a QR code (registered trademark of Denso Wave Incorporated) as the two-dimensional code. Note that the two-dimensional code which may be generated according to this embodiment is not limited to the QR code.

As shown in FIG. 1, a two-dimensional code symbol 10 according to this embodiment is formed by vertically and horizontally arranging 45 square modules in the shape of a square. Finder patterns 12, alignment patterns 13, and timing patterns 14 used when reading data from the symbol 10 are placed in the symbol 10. An encoding region 16, in which a module pattern (encoded pattern) of data read from the symbol 10 is placed, is provided as a region other than the region in which the finder pattern 12, the alignment pattern 13, and the timing pattern 14 are placed.

The encoding region 16 includes a version region 18 in which an encoded pattern of version information (size information) of the symbol 10 is placed, a format region 20 in which an encoded pattern of format information (error correction level information and mask pattern information) of the symbol 10 is placed, and a data region 22 in which an encoded pattern of data which can be arbitrarily input by the user of the system according to this embodiment is placed.

2. Two-Dimensional Code Generation Process

Figure 2:
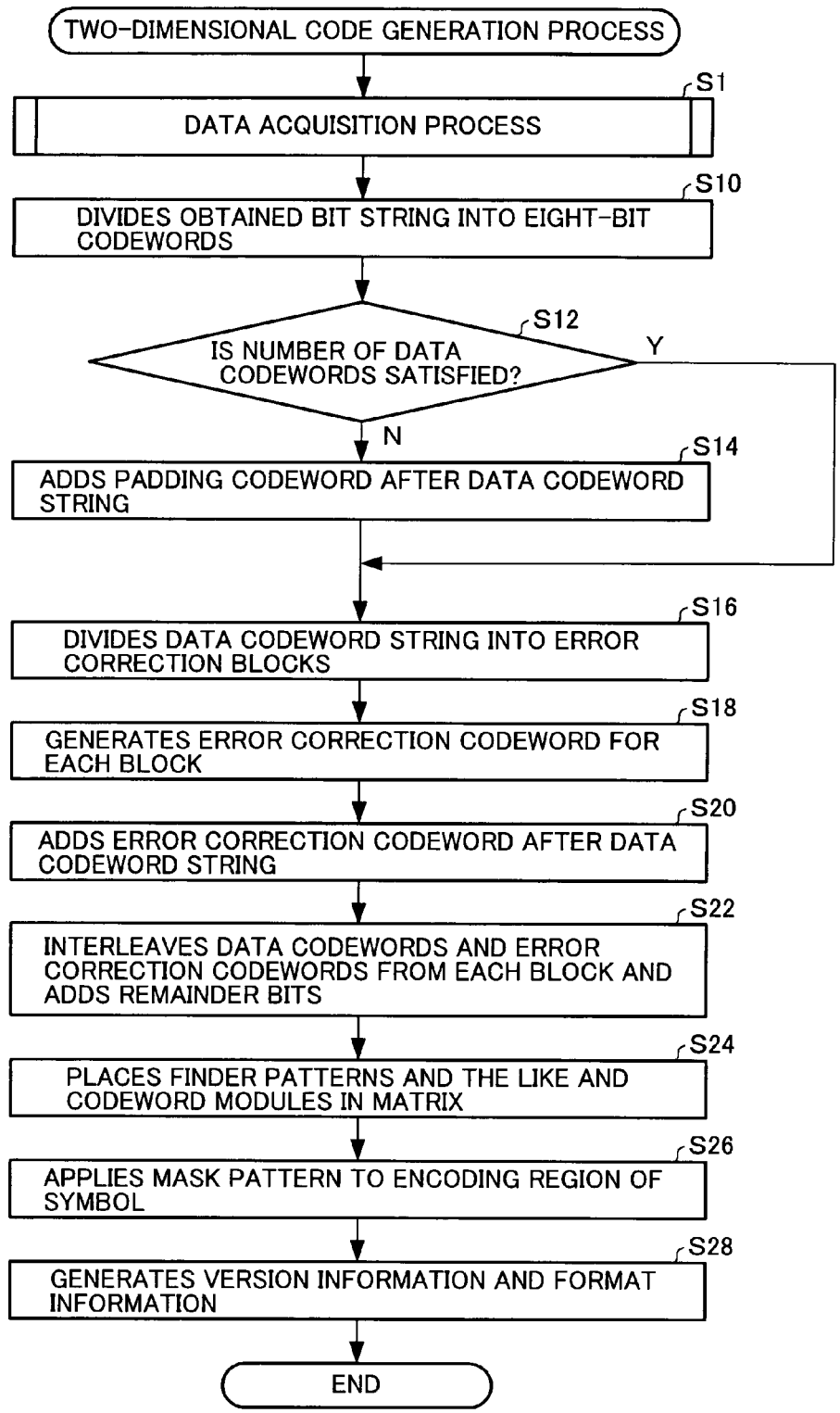
FIG. 2 is a flowchart showing an example of the process flow according to one embodiment of the invention.

FIG. 2 shows an example of the flow of the process of the two-dimensional code generation system according to this embodiment. In a step S1, the two-dimensional code generation system acquires various types of data for generating a two-dimensional code.

Figure 3:
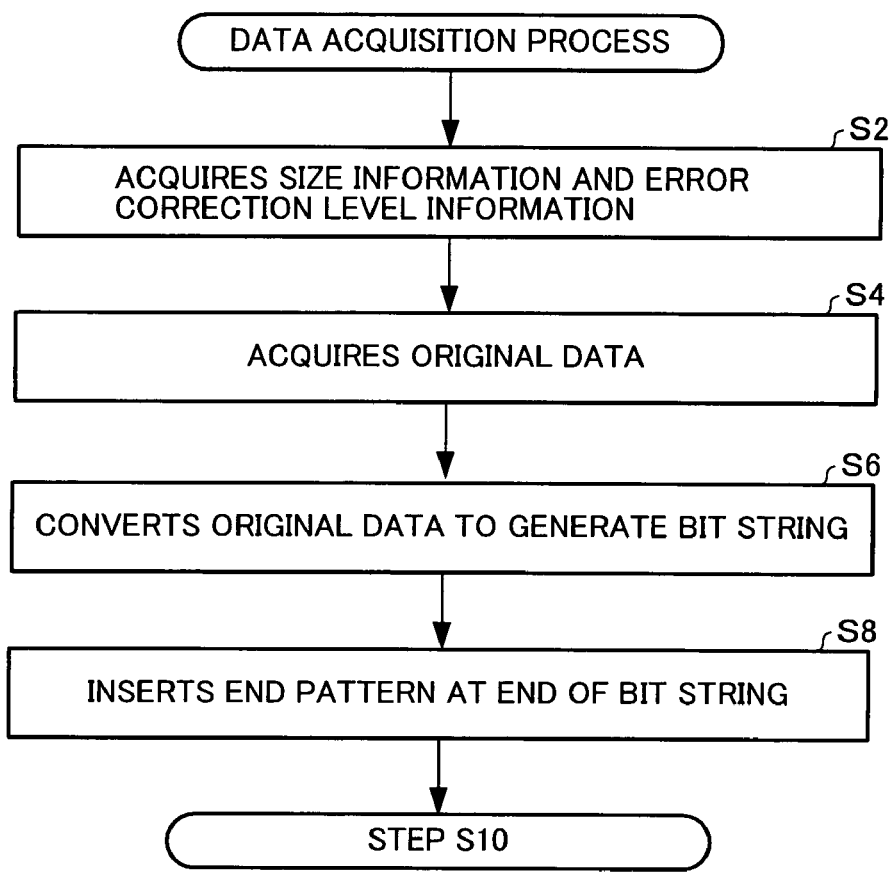
FIG. 3 is a flowchart showing an example of the process flow according to one embodiment of the invention.

FIG. 3 shows the details of the data acquisition process. In a step S2, the two-dimensional code generation system acquires version information and format information of the symbol requested by the user of the system based on information input to an input section. The version information includes size information (1 to 40) which specifies the size of the symbol 10. In this embodiment, the number and the arrangement of modules forming the symbol 10 can be specified by the size information. The format information includes error correction level information which specifies the type of error correction algorithm for correcting reading errors of the symbol to be generated. In this embodiment, four error correction levels L, M, Q, and H are provided. The error correction accuracy differs depending on the error correction level.

In a step S4, the two-dimensional code generation system acquires a character string of original data which is information the user of the system intends to convey using the two-dimensional code symbol. For example, network address information such as a URL or an e-mail address, management information, identification information, encoding information, and the like are input as the original data. In a step S6, the two-dimensional code generation system converts the acquired character string of the original data based on the format information of the two-dimensional code to generate a bit string of the original data. In a step S8, the two-dimensional code generation system inserts a bit string of an end pattern, which indicates the end of the original data, at the end of the bit string of the original data. The end pattern indicates that the encoded pattern subsequent to the end pattern need not be output as information when reading the two-dimensional code.

In a step S10 in FIG. 2, the two-dimensional code generation system divides the bit string of the original data including the end pattern into eight-bit codewords (data codewords) based on the format information of the two-dimensional code. In a step S12, the two-dimensional code generation system determines whether or not the number of data codewords required by the size and the error correction level is satisfied based on the acquired size information and error correction level information.

When the two-dimensional code generation system has determined that the required number of data codewords is not satisfied (i.e. when the amount of original data is small with respect to the size of the two-dimensional code) (N in step S12), the two-dimensional code generation system adds a padding codeword after the data codeword string in a step S14. When the amount of original data is small with respect to the size of the two-dimensional code, the two-dimensional code is not correctly read if a blank (only bright modules) occurs in the encoding region 16 subsequent to the encoded pattern representing the original data. The padding codeword is added taking this situation into consideration. In this embodiment, a specific encoded pattern indicating the absence of data is repeatedly added based on the format of the two-dimensional code.

When the two-dimensional code generation system has determined that the required number of data codewords is satisfied (Y in step S12), the two-dimensional code generation system divides the data codeword string into error correction blocks in a step S16 without adding the padding codeword, and generates an error correction codeword for each block in a step S18. The error correction codeword is a specific bit string unit for generating an encoded pattern of information used for an error correction algorithm for correcting reading errors of the two-dimensional code. In a step S20, the two-dimensional code generation system adds the error correction codeword after the data codeword string.

In a step S22, the two-dimensional code generation system interleaves the data codewords and the error correction codewords from each block based on the format information of the two-dimensional code, and adds the remainder bits, if necessary. In a step S24, the two-dimensional code generation system places the finder patterns 12, the alignment patterns 13, the timing patterns 14, and dark (black) modules and bright (white) modules corresponding to the codeword string in the matrix based on the format information of the two-dimensional code.

In a step S26, the two-dimensional code generation system applies the mask pattern to the encoding region 16 of the symbol. The masking process is a process for causing dark (black) modules and bright (white) modules placed in the encoding region 16 in the step S24 to be arranged in a well-balanced manner. In a step S28, the two-dimensional code generation system places the encoded pattern of the version information acquired in the step S2 in the version region 18 and places the encoded pattern of the format information in the format region 20 to complete the symbol.

Figure 4:
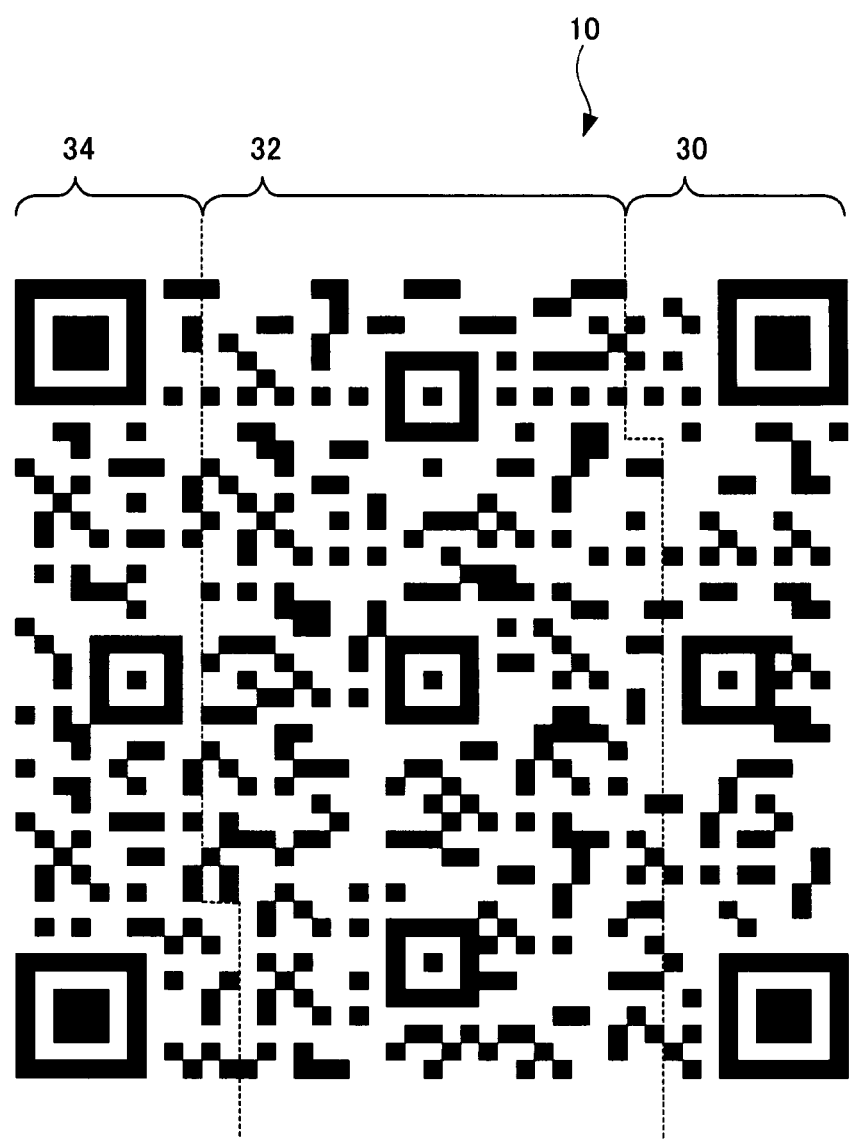
FIG. 4 is a diagram showing an example of a two-dimensional code generated according to one embodiment of the invention.

FIG. 4 shows an example of the two-dimensional code symbol thus generated. In this embodiment, placement of dark (black) modules and bright (white) modules corresponding to each codeword string starts from the lower right corner of the symbol 10 shown in FIG. 4. The modules alternately run upward and downward and are placed from the right to the left. The data codeword indicating the original data and the end pattern, the padding codeword, and the error correction codeword are arranged in each codeword string in that order. Therefore, an original data region 30 in which the encoded pattern of the original data is placed, an unused data region 32 in which the encoded pattern of the padding data is placed, and an error correction code region 34 in which the encoded pattern of the error correction code is placed are formed in the encoding region 16 of the symbol 10, as shown in FIG. 4.

3. Design Data Processing

In this embodiment, the two-dimensional code symbol 10 is generated so that the arrangement (pattern) of dark (black) modules and bright (white) modules in the unused data region 32 forms a given design by utilizing the fact that the encoded pattern in the unused data region 32 merely indicates the absence of data. In this embodiment, design data processing characteristic of this embodiment is performed in the data acquisition process in the step S1 in FIG. 2.

3-1. Binary Design Data Acquisition Process

Figure 5:
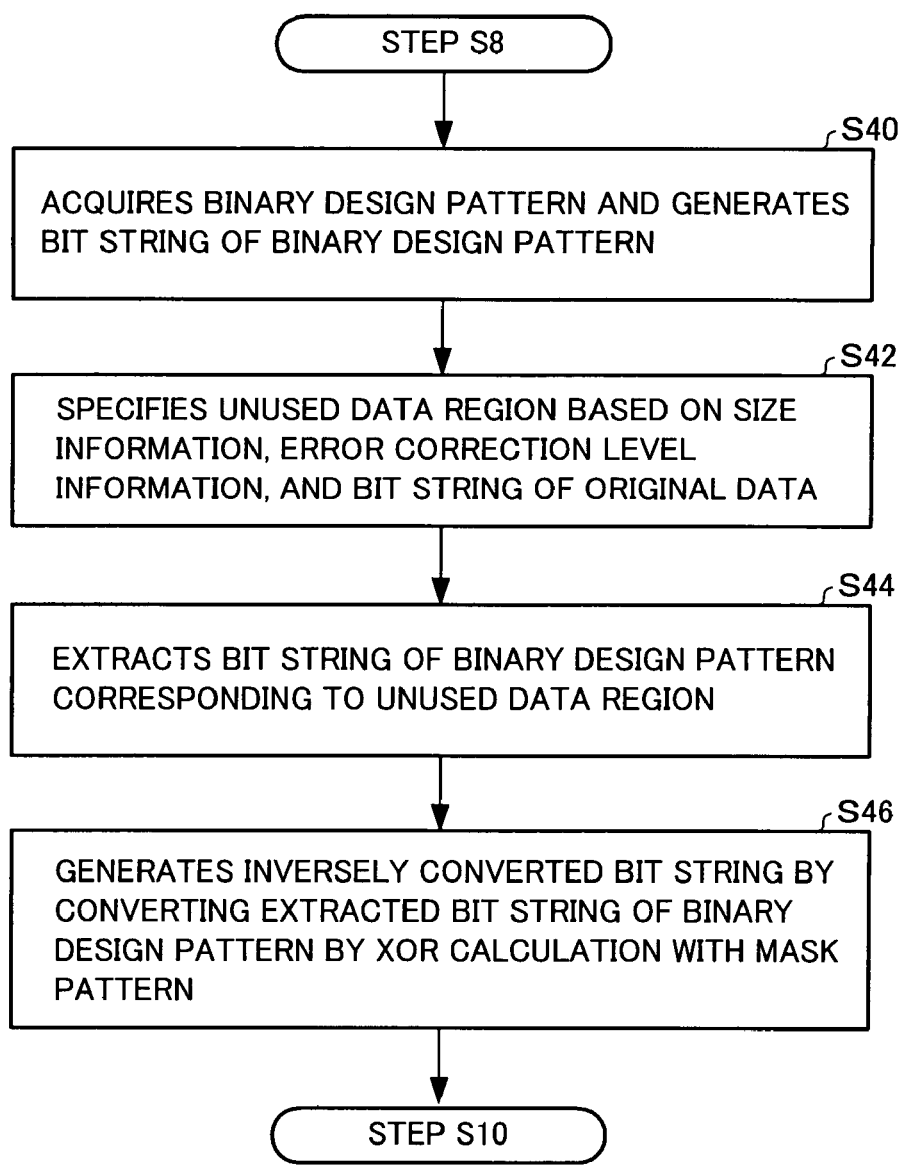
FIG. 5 is a flowchart showing an example of the process flow according to one embodiment of the invention.

FIG. 5 shows an example of the flow of the design data processing. When the two-dimensional code generation system has acquired the size information, the error correction level information, and the original data (steps S2 and S4), and has generated the bit string of the original data based on the format information of the two-dimensional code (steps S6 and S8) in FIG. 3, the two-dimensional code generation system acquires a given binary design pattern associated with the matrix of the two-dimensional code, and generates a bit string (binary design data) of the binary design pattern in a step S40 in FIG. 5.

In this embodiment, the two-dimensional code generation system allows the user of the system to designate each module as a dark (black) module or a bright (white) module on the matrix based on the format of the two-dimensional code to create a binary design pattern (e.g. picture, character, symbol, or pattern) in order to acquire the binary design pattern. The two-dimensional code generation system associates the acquired binary design pattern with the matrix (each module) of the two-dimensional code, and generates a bit string of the binary design pattern corresponding to the format of the two-dimensional code.

Figure 6A:
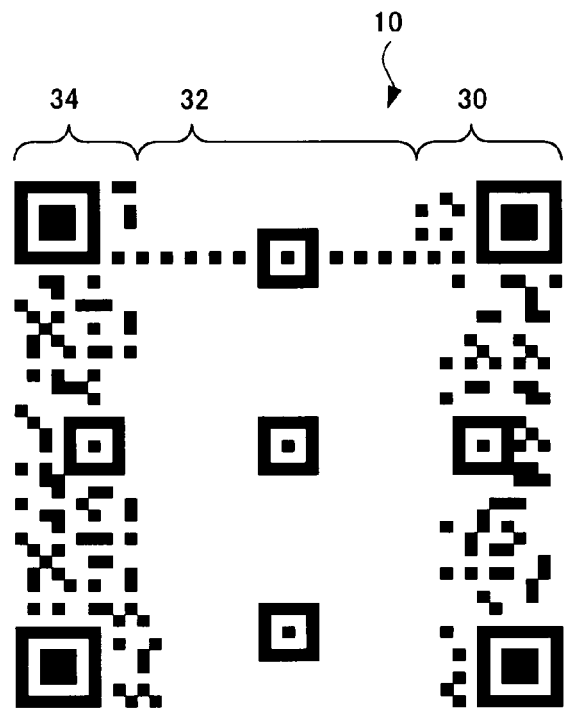
FIGS. 6A and 6B are diagrams showing examples of a screen displayed on a display section according to one embodiment of the invention.

FIG. 6A shows an example of a display screen displayed on a display section in order to allow the user of the system to create a binary design pattern. In this embodiment, the original data region 30 is determined based on the size information and the amount of original data, and the error correction data region 34 is determined based on the size information, as shown in FIG. 4. Therefore, the original data region 30 can be specified based on the size information and the bit string of the original data, the error correction data region 34 can be specified based on the size information, and the unused data region 32 as the design region can be specified based on the size information, the original data region 30, and the error correction data region 34. Therefore, the two-dimensional code symbol 10 can be displayed so that the unused data region 32 as the design region is blank, as shown in FIG. 6A.

Figure 6B:
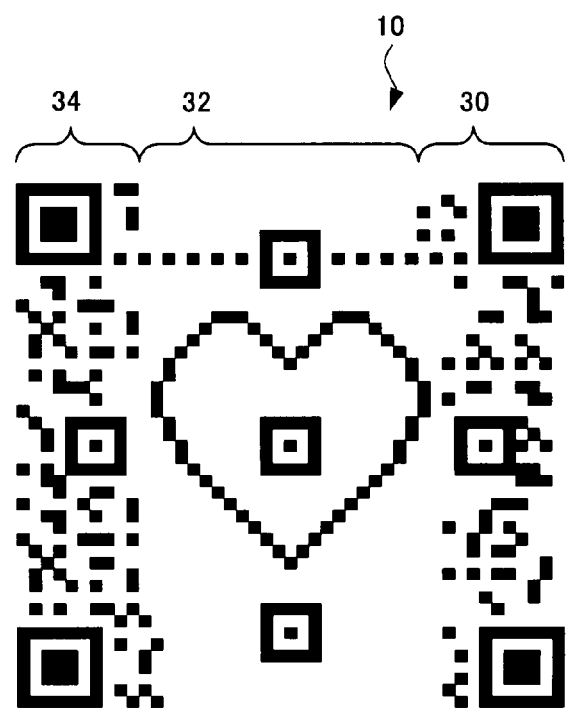

FIG. 6B shows an example of the binary design pattern created by the user. The example shown in FIG. 6B is created by displaying the two-dimensional code symbol 10 shown in FIG. 6A on the display section, and allowing the user to set each module in the unused data region 32 as a dark (black) module or a bright (white) module to create a binary design pattern. In the example shown in FIG. 6B, when the user has designated each module as a dark (black) module or a bright (white) module, the two-dimensional code generation system associates the created binary design pattern with each module in the unused data region 32 to generate the bit string of the binary design pattern.

3-2. Binary Design Data Inverse Conversion

In this embodiment, the codeword module pattern is converted by XOR calculation with the mask pattern when generating the two-dimensional code, as shown in the step S26 in FIG. 2. Therefore, even if the bit string of the binary design pattern which forms a given design in the unused data region 32 of the two-dimensional code is generated, the bit string of the binary design pattern is converted into a bit string which does not form a design on the two-dimensional code by XOR calculation with the mask pattern.

In this embodiment, the generated bit string of the binary design pattern is inversely converted in advance so that the bit string of the binary design pattern is recovered by performing XOR calculation with the mask pattern when generating the two-dimensional code. In this embodiment, the binary design pattern is converted by XOR calculation with the mask pattern before applying the mask pattern in the step S26 in FIG. 2.

In more detail, the two-dimensional code generation system specifies the unused data region 32 based on the size information, the error correction level information, and the bit string of the original data in a step S42 in FIG. 5, and extracts the bit string of the binary design pattern corresponding to the unused data region 32 in a step S44. In a step S46, the two-dimensional code generation system converts the extracted bit string of the binary design pattern by XOR calculation with the bit string of the mask pattern.

Figure 7:
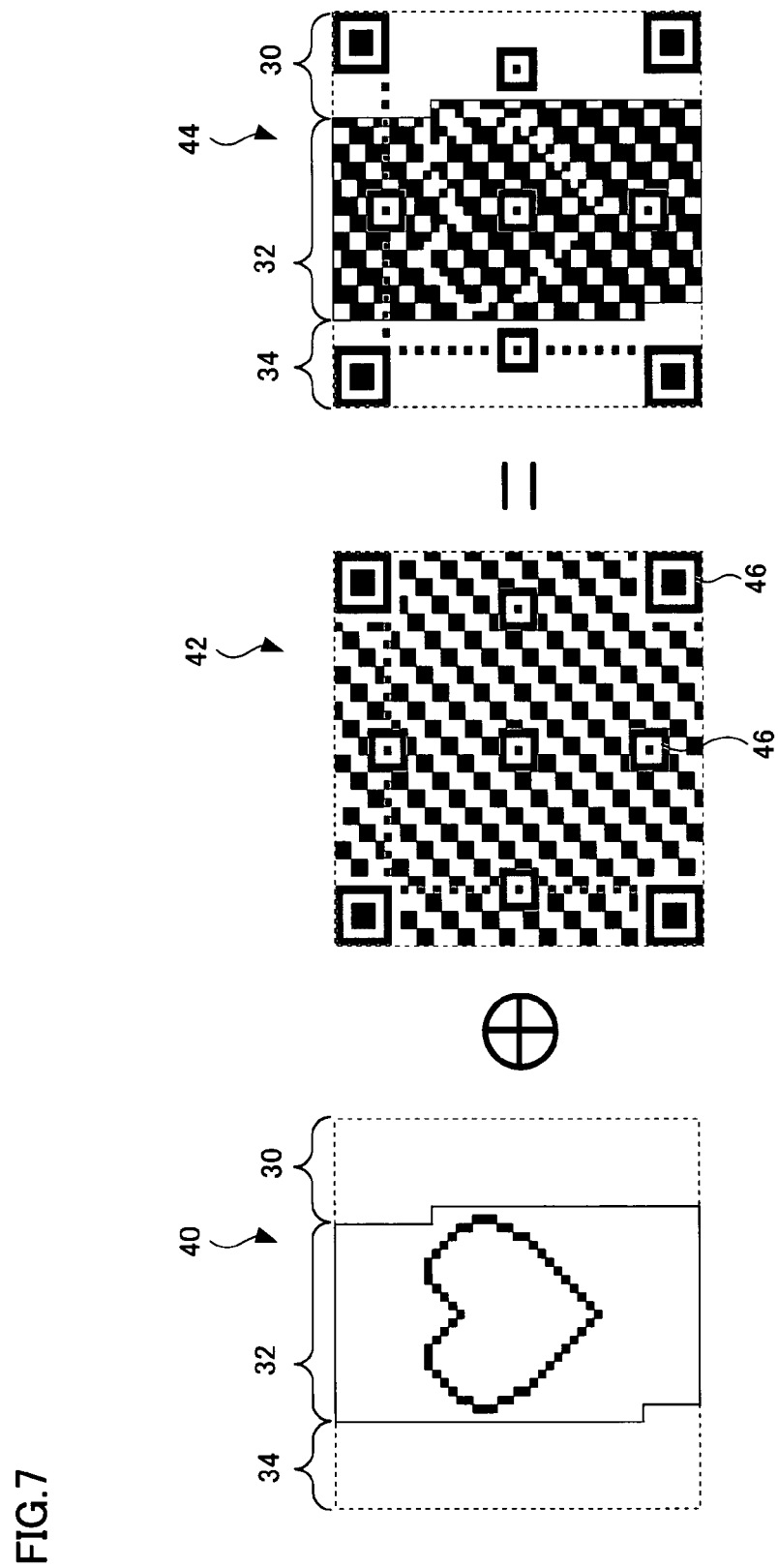
FIG. 7 is a diagram illustrative of an example of inverse conversion according to one embodiment of the invention.

FIG. 7 shows an example of an inversely converted module pattern 44 obtained by converting a binary design pattern 40 extracted from the example shown in FIG. 6B by XOR calculation with a mask pattern 42. In this embodiment, when the corresponding modules of the binary design pattern 40 and the mask pattern 42 are identical modules, the module is used as a dark (black) module (0+0=1, 1+1=1), and when the corresponding modules of the binary design pattern 40 and the mask pattern 42 are different modules, the module is used as a bright (white) module (0+1=0, 1+0=0), as shown in FIG. 7.

Therefore, the inversely converted module pattern 44 obtained by conversion through XOR calculation does not form a design. The binary design pattern is recovered by again performing XOR calculation with the mask pattern when generating the two-dimensional code. The inversely converted bit string is thus generated by inversely converting the bit string of the binary design pattern corresponding to the unused data region 32 using the mask pattern. Note that the masking process is not applied to gray regions such as the four corners of the mask pattern 42 (i.e. regions 46 corresponding to the finder patterns 12, the alignment patterns 13, and the timing patterns 14 of the two-dimensional code to be generated).

In the step S10 in FIG. 2, the two-dimensional code generation system divides the bit string of the original data including the end pattern generated in the step S8 in FIG. 3 and the inversely converted bit string of the binary design pattern into data codewords, and determines whether or not the resulting data codeword string satisfies the number of data codewords in the step S12.

The inversely converted bit string of the binary design pattern includes all modules in the unused data region 32. Therefore, the two-dimensional code generation system determines that the data codeword string including the bit string of the original data and the inversely converted bit string satisfies the number of data codewords in the step S12 (Y in step S12). Accordingly, the two-dimensional code generation system performs the process in the steps S16 to S24 based on the format of the two-dimensional code without adding the padding codeword in the step S14. As a result, an unmasked pattern 52 is generated in which the finder pattern 12 and the like are placed in the same manner as in a module pattern 54 on the left in FIG. 8 and which includes a module pattern 48 of the original data, the inversely converted module pattern 44, and an error correction code pattern 50 corresponding to these patterns.

Figure 8:
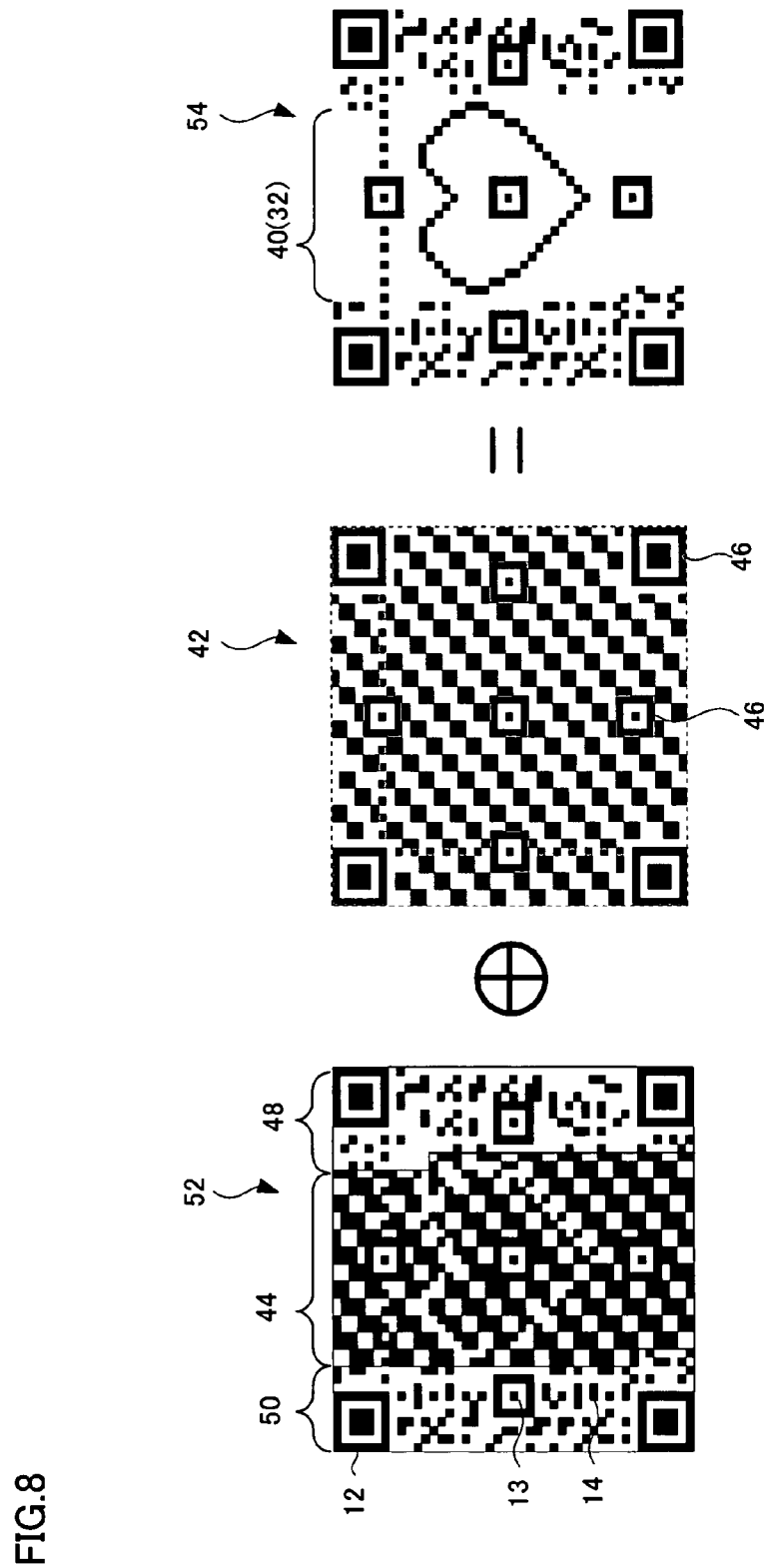
FIG. 8 is a diagram illustrative of an example of a two-dimensional code generation process according to one embodiment of the invention.

When the two-dimensional code generation system applies the mask pattern to the unmasked pattern 52 in the step S26, the inversely converted bit string of the binary design pattern is converted into the original bit string of the binary design pattern. Specifically, a designed two-dimension code symbol 54 in which the binary design pattern 40 is formed in the unused data region 32 can be generated by converting the unmasked pattern 52 by XOR calculation with the mask pattern 42, as shown in FIG. 8.

According to this embodiment, the two-dimensional code symbol 54 in which the binary design pattern 40 is formed can be generated according to the normal two-dimensional code generation procedure by generating the inversely converted module pattern 44 in advance. Since the module pattern 48 of the original data is placed in the original data region 30 of the two-dimensional code symbol 54 in which the binary design pattern 40 is formed, the original data, which is information the user of the system intends to convey using the two-dimensional code symbol, can be read by causing a two-dimensional code reading device to read the two-dimensional code 54. In this embodiment, since the binary design pattern 40 is added after the end pattern of the module pattern of the original data, the binary design pattern 40 in the unused data region 32 does not represent data even if a reading device reads the binary design pattern 40.

According to this embodiment, a two-dimensional code in which an attractive binary design pattern is formed can be easily generated according to the normal two-dimensional code generation procedure. Moreover, since the two-dimensional code is generated according to the normal two-dimensional code generation procedure, a reading device can accurately read the two-dimensional code, even if the binary design is formed.

In the step S44 in FIG. 5, the two-dimensional code generation system may also extract the bit string of the original data corresponding to the original data region 30, and may convert the bit string of the original data and the bit string of the binary design pattern by XOR calculation with the mask pattern. Specifically, it suffices that at least the bit string of the binary design pattern corresponding to the unused data region 32 be inversely converted.

This embodiment has been described above using an example of performing inverse conversion taking into consideration conversion using the mask pattern when generating the two-dimensional code. When the acquired bit string of the binary design pattern is subjected to another type of conversion when generating the two-dimensional code, the generated bit string of the binary design pattern is inversely converted in advance so that the bit string of the binary design pattern is recovered by the other type of conversion. The term "inverse conversion" used herein refers to a process of converting the bit string of the binary design pattern into a bit string which returns to the bit string of the binary design pattern by performing conversion used when generating the two-dimensional code. In this embodiment, inverse conversion and conversion used when generating the two-dimensional code are identical conversion involving XOR calculation. This also falls under the concept of inversion conversion.

When multiple mask patterns are applied in the masking process in the step S26 in FIG. 2 and a mask pattern which allows modules to be placed in the best-balanced manner is selected based on a specific evaluation function, mask pattern information which specifies the mask pattern applied in the masking process may be acquired in the step S2 in FIG. 3, and inverse conversion in the step S46 in FIG. 5 and conversion in the step S26 in FIG. 2 may be performed using the specified mask pattern.

4. Process of Changing Encoded Pattern

In the two-dimensional code according to this embodiment, reading errors which occur when a two-dimensional code reading device reads the encoded pattern in the encoding region 16 can be corrected using an error correction code pattern placed in the error correction code region 34. For example, when the error correction level is L, the recovery capacity is 7% so that the original correct module pattern can be recovered even if seven modules among about 100 modules are read as an incorrect pattern due to dirt or the like.

Figure 9A:
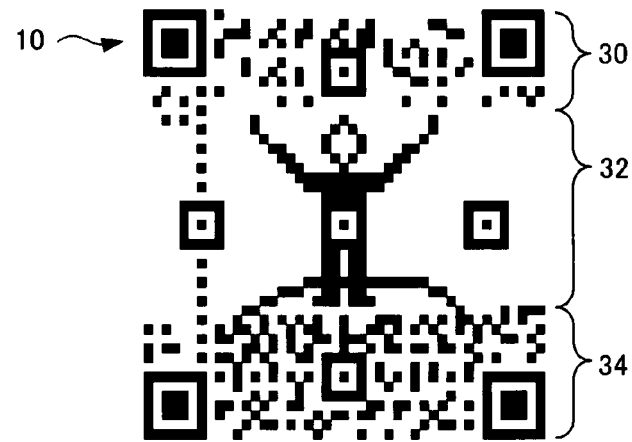
FIGS. 9A and 9B are diagrams illustrative of a process of changing an encoded pattern according to one embodiment of the invention.
Figure 9B:
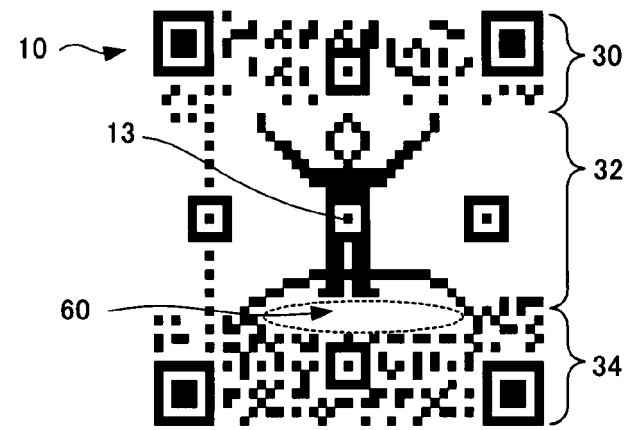
Figure 9C:
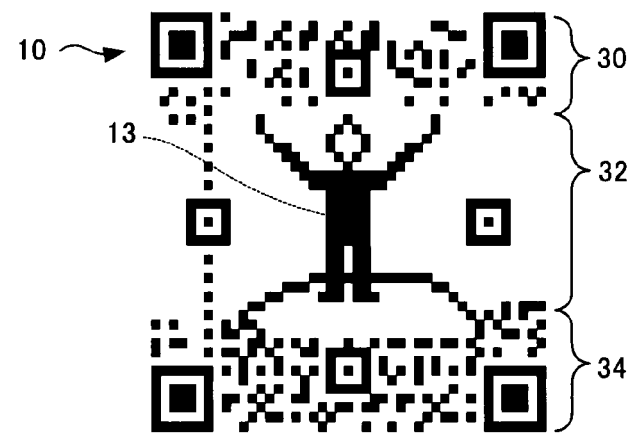
FIG. 9C is a diagram illustrative of a process of omitting an alignment pattern according to one embodiment of the invention.

In this embodiment, the two-dimensional code generation system accepts a process of changing the generated two-dimensional code based on the error correction level information of the two-dimensional code generated as described above. In more detail, the two-dimensional code generation system displays the two-dimensional code symbol 10, which is generated according to this embodiment and in which a given binary design pattern is placed, on a display section, as shown in FIG. 9A. The two-dimensional code generation system accepts a module change setting from the user of the system. Note that the symbols 10 shown in FIGS. 9A to 9C are displayed in a state in which the symbols 10 shown in FIGS. 6A and 6B are rotated 90° counterclockwise.

In the example shown in FIG. 9A, a situation is designed in which a person stands on an island floating on the sea. However, the outline of the island is unclear due to the module pattern in the error correction code region 34. According to this embodiment, the two-dimensional code generation system accepts the module change setting and deletes the dark (black) modules in a region 60 in the error correction code region 34 to make the outline of the island clear, as shown in FIG. 9B. In this embodiment, part of the error correction data region 34 can also be utilized as the design region in this manner.

The bits of the bit string corresponding to the change target modules are also changed. In this case, the number of modules for which the change setting is accepted is limited based on the error correction level information and the size information which have been set.

For example, when the error correction level information is "M" (recovery capacity: 15%) and the size information is the version 7 (number of data bits: 1248), the change setting is accepted for up to 100 modules. When the error correction level information is "H" (recovery capacity: 30%) and the size information is the version 15 (number of data bits: 1784), the change setting is accepted for up to 300 modules, for example.

As shown in FIG. 9C, the two-dimensional code generation system may accept a process of omitting the alignment pattern 13 which is displayed in FIG. 9B. In this case, the two-dimensional code generation system deletes the placed alignment pattern 13 in the step S24 in FIG. 2. The process of omitting the alignment pattern 13 may be configured so that the two-dimensional code generation system acquires information indicating omission of placement of the alignment pattern 13 in advance in the data acquisition process in the step S1 in FIG. 2, and omits placement of the alignment pattern 13 in the step S24 in FIG. 2.

5. Configuration

Figure 10:
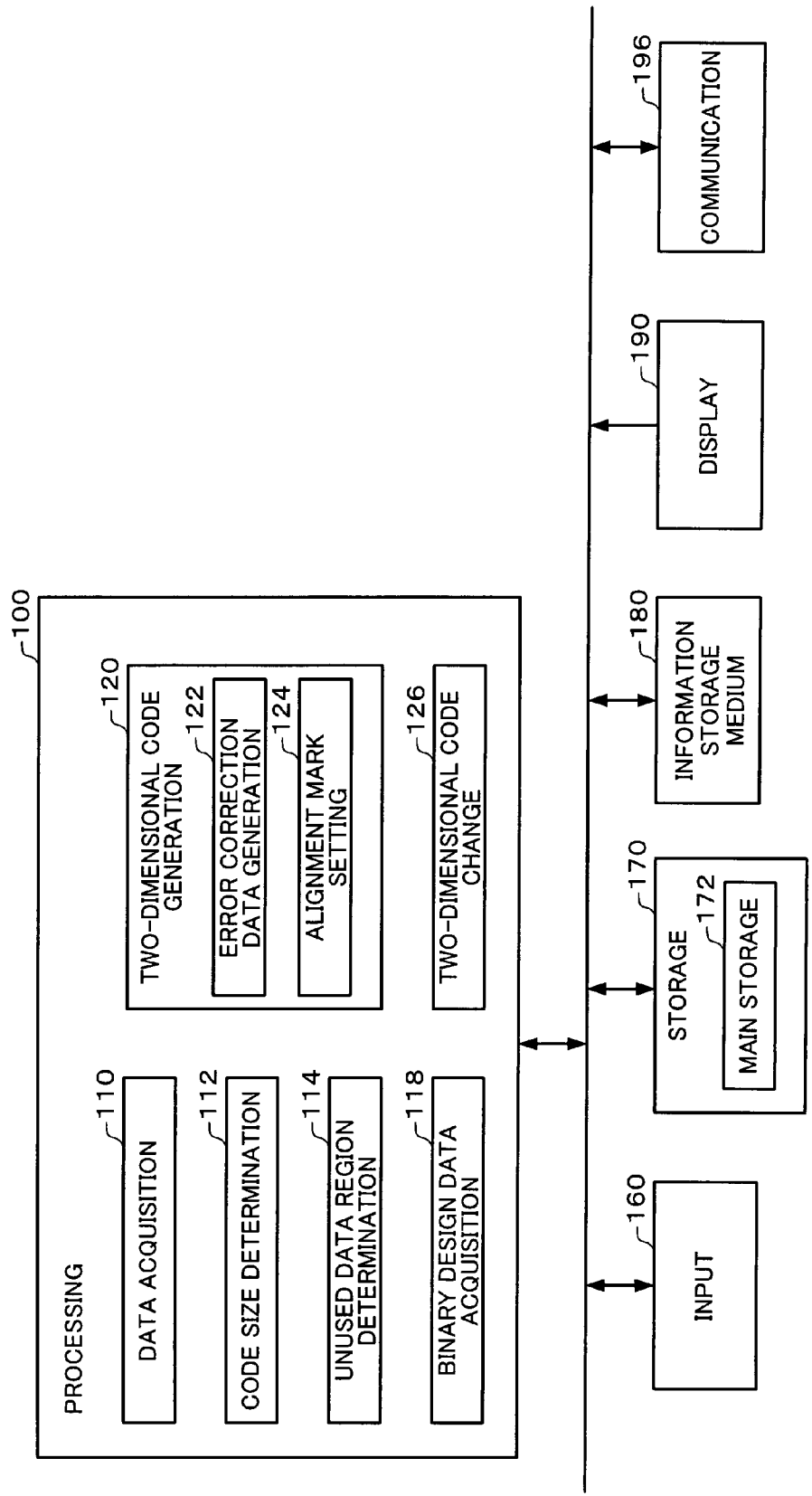
FIG. 10 is a diagram showing an example of functional blocks according to one embodiment of the invention.

FIG. 10 shows an example of a functional block diagram of the two-dimensional code generation system according to this embodiment. Note that the two-dimensional code generation system according to this embodiment may have a configuration in which some of the elements (sections) shown in FIG. 10 are omitted.

An input section 160 is used to input basic data of the two-dimensional code to be generated, original data to be read from the generated two-dimensional code, design data formed in the generated two-dimensional code, and the like. The function of the input section 160 may be implemented by a button, a lever, a touch panel display section (device which displays an image on the panel and allows information to be input by touching or pressing the screen by the finger or using a pen) having the functions of an input section and a display section, and the like. The design data may be input using an optical reading device such as a scanner or a camera.

A storage section 170 provides a work area for a processing section 100 and the like. The function of the storage section 170 may be implemented by hardware such as a RAM.

An information storage medium 180 (computer-readable medium) stores a program, data, and the like. The function of the information storage medium 180 may be implemented by hardware such as an optical disk (CD or DVD), a magneto-optical disk (MO), a magnetic disk, a hard disk, a magnetic tape, or a memory (ROM). The processing section 100 performs various processes according to this embodiment based on a program (data) stored in the information storage medium 180. Specifically, a program for causing a computer to function as each section according to this embodiment (program for causing a computer to implement each section) is stored (recorded) in the information storage medium 180.

A display section 190 outputs an image generated according to this embodiment. The function of the display section 190 may be implemented by a CRT, a liquid crystal display, a plasma display, or a touch panel display section having the functions of an input section and a display section.

The communication section 196 performs various types of control for communicating with the outside (e.g. host or another terminal). The function of the communication section 196 may be implemented by hardware such as various processors or a communication ASIC, a program, and the like.

The program (data) for causing a computer to function as each section according to this embodiment may be distributed to the information storage medium 180 (storage section 170) from an information storage medium included in a host (server) through a network (wide area network or Internet) and the communication section 196. Use of the information storage medium of the host (server) is included within the scope of the invention.

The processing section 100 (processor) performs various processes, such as displaying data, processing data, converting data, and generating a two-dimensional code, based on data input from the input section 160, a program, and the like. In this case, the processing section 100 performs various processes using a main storage section 172 in the storage section 170 as a work area. The function of the processing section 100 may be implemented by hardware such as various processors (e.g. CPU or DSP) or ASIC (e.g. gate array) and a program.

The processing section 100 includes a data acquisition section 110, a code size determination section 112, an unused data region determination section 114, a binary design data conversion section 118, a two-dimensional code generation section 120, and a two-dimensional code change section 126. The processing section 100 need not necessarily include all of these sections (functional blocks), and some of these sections may be omitted.

The data acquisition section 110 acquires the version information (size information) and the format information (error correction level information) of the symbol based on the information input to the input section 160. The data acquisition section 110 converts the original data (e.g. network address information), which is information the user of the system intends to convey using the two-dimensional code symbol, into a bit code (bit string) based on the format of the two-dimensional code.

The data acquisition section 110 converts given binary design data associated with the two-dimensional code into a bit code (bit string) based on the format of the two-dimensional code. The data acquisition section 110 may acquire the bit code of the binary design pattern by acquiring the design pattern input by the user while being associated with each module in the unused data region 32. The data acquisition section 110 may perform conversion in which design data captured using hardware such as a scanner or design data stored in the information storage medium is associated with the matrix of the two-dimensional code, and may acquire the design data as the binary design pattern.

The code size determination section 112 may determine the size of the two-dimensional code based on the size (region and number of bits) of the acquired binary design data. For example, the code size determination section 112 may determine the size information of the two-dimensional code so that the modules corresponding to the acquired binary design pattern are placed within the unused data region 32, and the data acquisition section 110 may acquire the size information. In this case, the size information of the two-dimensional code which can provide the unused data region 32 in which the binary design pattern can be placed may be specified based on the bit code of the original data and the bit code of the binary design data.

The unused data region determination section 114 specifies the unused data region 32 of the two-dimensional code corresponding to the amount of original data based on the size information of the two-dimensional code and the bit code obtained by converting the original data. In more detail, the unused data region determination section 114 specifies the error correction data region 34 based on the size information, specifies the original data region 30 based on the original data, and specifies the unused data region 32 based on the size information, the error correction data region 34, and the original data region 30.

The binary design data conversion section 118 calculates a bit code obtained by inversely converting the binary design data corresponding to the unused data region 32 based on the format information of the two-dimensional code. In more detail, the binary design data conversion section 118 calculates a bit code obtained by inversely converting the bit code of the binary design pattern by performing each process shown and illustrated in FIG. 5.

The two-dimensional code generation section 120 converts the bit code obtained by inversely converting the binary design data and the bit code representing the original data based on the format information of the two-dimensional code to generate the two-dimensional code. In more detail, the two-dimensional code generation section 120 generates the two-dimensional code by performing each process shown and illustrated in FIG. 2.

The two-dimensional code generation section 120 includes an error correction data generation section 122 and an alignment pattern setting section 124. The error correction data generation section 122 generates error correction data for correcting reading errors of the two-dimensional code to be generated based on the bit code obtained by inversely converting the binary design data and the bit code representing the original data. The alignment pattern setting section 124 places the alignment pattern 13 used when reading the two-dimensional code.

The alignment pattern setting section 124 may accept the process of omitting the alignment pattern 13. For example, the alignment pattern setting section 124 may not place the alignment pattern 13 based on information set before generating the two-dimensional code. The alignment pattern setting section 124 may not place the alignment pattern 13 included in a specific coverage region corresponding to the binary design pattern according to a specific algorithm. The alignment pattern setting section 124 may delete the alignment pattern 13 based on the input information after completing the two-dimensional code symbol 10 by placing the alignment pattern 13.

The two-dimensional code change section 126 accepts the process of changing the generated two-dimensional code based on the error correction level data. In this embodiment, the four error correction levels are provided, and the recovery capacity of each level is determined in advance. Therefore, the two-dimensional code change section 126 accepts changes in the placed modules (bits) within the range of the number of modules (number of bits or number of patterns), within which the two-dimensional code can be recovered even if the modules are changed, based on the size information of the two-dimensional code and the error correction level information.

6. Use of Two-Dimensional Code

The two-dimensional code which is generated according to this embodiment and in which a given binary design pattern is placed in the unused data region 32 may be utilized in a state in which the two-dimensional code is printed on various printed materials. The two-dimensional code may be displayed on a display section such as a monitor through various media such as television broadcasting, video broadcasting, and a game machine. In this case, image data of the two-dimensional code which is generated according to this embodiment and in which the binary design pattern is placed may be generated and displayed on a display section.

In particular, when displaying an image of the two-dimensional code generated according to this embodiment, multiple binary design patterns to be placed in the unused data region 32 are provided. As the multiple binary design patterns, binary design patterns with different shapes (e.g. circle, triangle, or quadrangle) may be provided, or multiple binary design patterns may be provided as divided frames of a given motion so that a running person is displayed by continuously switching and displaying the binary design patterns.

An error correction code pattern used when placing each binary design pattern in the unused data region 32 is also provided. Then, image data of the multiple binary design patterns and the corresponding error correction code patterns is generated. The image of the binary design pattern and the image of the error correction code pattern are associated and changed without changing the image data of the original data region 30. This makes it possible to provide a more attractive two-dimensional code by changing the binary design pattern of the two-dimensional code image. Moreover, since the error correction code pattern is changed corresponding to the change in the binary design pattern, the two-dimensional code can be accurately read even if the binary design pattern of the two-dimensional code image is changed. Note that the module pattern of the original data may also be changed instead of changing the images of only the binary design pattern and the error correction code pattern.

The invention is not limited to the above-described embodiments. Various modifications and variations may be made. For example, any term cited with a different term having a broader meaning or the same meaning at least once in the specification and the drawings may be replaced by the different term in any place in the specification and the drawings.

The invention may be applied to various two-dimensional codes such as a stacked two-dimensional code in addition to matrix two-dimensional codes such as the QR code. In this case, each process is performed according to the format of each two-dimensional code.

The invention may be applied to a program for generating a bit code for generating a two-dimensional code in which a design pattern is placed, a program for generating a two-dimensional code image in which a design pattern is placed, and an information storage medium and a system storing these programs in addition to the program for generating a two-dimensional code in which a design pattern is placed.

Although only some embodiments of the invention have been described in detail above, those skilled in the art will readily appreciate that many modifications are possible in the embodiments without materially departing from the novel teachings and advantages of this invention. Accordingly, all such modifications are intended to be included within the scope of the invention.

The invention claimed is:

1. A program used for generating a two-dimensional code, the program causing a computer to function as:
   a data acquisition section which acquires size data of the two-dimensional code, original data to be read from the two-dimensional code, and given binary design data;
   an unused data region determination section which specifies an unused data region of the two-dimensional code depending on an amount of the original data, based on the size data and the original data;
   a binary design data conversion section which calculates a bit code by inversely converting the binary design data corresponding to the unused data region based on format information of the two-dimensional code; and
   a two-dimensional code generation section which converts the calculated bit code and a bit code of the original data based on the format information of the two-dimensional code to generate the two-dimensional code.

2. The program as defined in claim 1,
   wherein the two-dimensional code generation section includes an error correction data generation section which generates error correction data for correcting reading errors of the two-dimensional code to be generated based on the bit code; and
   wherein the unused data region determination section specifies an error correction data region of the two-dimensional code based on the size data, specifies an original data region of the two-dimensional code based on the original data, and specifies the unused data region based on the size data of the two-dimensional code, the error correction data region, and the original data region.

3. The program as defined in claim 2,
   wherein the error correction data generation section generates the error correction data based on error correction level data; and
   wherein the program further causes the computer to function as a two-dimensional code change section which accepts a process of changing the generated two-dimensional code based on the error correction level data.

4. The program as defined in claim 3,
   wherein the two-dimensional code generation section further includes an alignment pattern setting section which sets an alignment pattern used for reading the two-dimensional code; and
   wherein the alignment pattern setting section accepts a process of omitting the alignment pattern.

5. The program as defined in claim 3, further causing the computer to function as:
   a code size determination section which determines the size of the two-dimensional code based on the size of the binary design data.

6. The program as defined in claim 2,
   wherein the two-dimensional code generation section further includes an alignment pattern setting section which sets an alignment pattern used for reading the two-dimensional code; and
   wherein the alignment pattern setting section accepts a process of omitting the alignment pattern.

7. The program as defined in claim 2, further causing the computer to function as:
   a code size determination section which determines the size of the two-dimensional code based on the size of the binary design data.

8. The program as defined in claim 1,
   wherein the two-dimensional code generation section further includes an alignment pattern setting section which sets an alignment pattern used for reading the two-dimensional code; and
   wherein the alignment pattern setting section accepts a process of omitting the alignment pattern.

9. The program as defined in claim 8, further causing the computer to function as:
   a code size determination section which determines the size of the two-dimensional code based on the size of the binary design data.

10. The program as defined in claim 8, further causing the computer to function as:
    a code size determination section which determines the size of the two-dimensional code based on the size of the binary design data.

11. A non-transitory computer-readable information storage medium storing the program as defined in claim 1.

12. A printed material on which the two-dimensional code generated by the program as defined in claim 1 is printed.

13. A program used for generating data for generating a two-dimensional code, the program causing a computer to function as:
    a data acquisition section which acquires size data of the two-dimensional code, original data to be read from the two-dimensional code, and given binary design data;
    an unused data region determination section which specifies an unused data region of the two-dimensional code depending on an amount of the original data, based on the size data and the original data; and
    a binary design data conversion section which calculates a bit code by inversely converting the binary design data corresponding to the unused data region based on format information of the two-dimensional code.

14. A program used for generating a two-dimensional code image to be read as a two-dimensional code, the program causing a computer to function as:
    an image generation section which generates the two-dimensional code image based on data of an original data image to be read from the two-dimensional code and data of a binary design image set in an unused data region of the two-dimensional code, wherein the image generation section changes the data of the binary design image to generate the two-dimensional code image.

15. A two-dimensional code generation system comprising:
   a data acquisition section which acquires size data of the two-dimensional code, original data to be read from the two-dimensional code, and given binary design data;
   an unused data region determination section which specifies an unused data region of the two-dimensional code depending on an amount of the original data, based on the size data and the original data;
   a binary design data conversion section which calculates a bit code by inversely converting the binary design data corresponding to the unused data region based on format information of the two-dimensional code; and
   a two-dimensional code generation section which converts the calculated bit code and a bit code of the original data based on the format information of the two-dimensional code to generate the two-dimensional code.

16. An image generation system which generates a two-dimensional code image to be read as a two-dimensional code, the image generation system comprising:
   an image generation section which generates the two-dimensional code image based on data of an original data image to be read from the two-dimensional code and data of a binary design image set in an unused data region of the two-dimensional code,
   wherein the image generation section changes the data of the binary design image to generate the two-dimensional code image.

* * * * *